United States Patent [19]

Branover

[11] 4,381,463
[45] Apr. 26, 1983

[54] METHOD AND APPARATUS FOR PRODUCING ELECTRICAL POWER AND FOR THE SIMULTANEOUS HEATING OF FLUID, UTILIZING A MAGNETOHYDRODYNAMIC GENERATOR

[75] Inventor: Herman Branover, Beer-Sheva, Israel

[73] Assignee: Ben-Gurion University of the Negev Research and Development Authority, Beer Sheva, Israel

[21] Appl. No.: 205,612

[22] Filed: Nov. 10, 1980

Related U.S. Application Data

[63] Continuation-in-part of Ser. No. 78,786, Sep. 28, 1979, abandoned.

[51] Int. Cl.³ .................................................. H02K 45/00
[52] U.S. Cl. ................................................................ 310/11
[58] Field of Search ........................ 310/2, 11; 60/641

[56] References Cited
U.S. PATENT DOCUMENTS

| | | | |
|---|---|---|---|
| 2,969,637 | 1/1961 | Rowekamp | 60/641 |
| 3,158,764 | 11/1964 | Webb | 310/11 |
| 3,430,081 | 2/1969 | Zauderer | 310/11 |
| 3,443,129 | 5/1969 | Hammitt | 310/11 |

*Primary Examiner*—Donovan F. Duggan
*Attorney, Agent, or Firm*—Laubscher, Philpitt & Laubscher

[57] ABSTRACT

There is provided a method and an apparatus for producing electrical power and for the simultaneous heating of fluid by means of a magnetohydrodynamic (MHD) generator. The method comprises providing a heating means for heating a mixture of liquid metal and an organic liquid to form a two-phase liquid metal-vapor flow, directing the two-phase liquid metal-vapor through a MHD-generator to generate electricity, condensing the vapor phase from the two-phase liquid metal-vapor to form liquid metal carrying organic liquid droplets, and recycling the metal and organic liquid droplets to be reheated by the heating means. The MHD apparatus comprises a closed duct system containing a mixture of liquid metal and an organic liquid, a heating means for heating the mixture in the closed system, a MHD-generator, located along the flow path of a two-phase liquid metal-vapor flow formed by the heated mixture, means for condensing the two-phase flow to form a single phase flow of metal liquid containing organic liquid droplets, and means for propelling the single-phase flow to be reheated by the heating means.

14 Claims, 3 Drawing Figures

METHOD AND APPARATUS FOR PRODUCING ELECTRICAL POWER AND FOR THE SIMULTANEOUS HEATING OF FLUID, UTILIZING A MAGNETOHYDRODYNAMIC GENERATOR

This application is a continuation-in-part of application Ser. No. 78,786, filed Sept. 28, 1979, now abandoned.

BRIEF DESCRIPTION OF THE PRIOR ART

The present invention relates to a method and apparatus for simultaneous heating of fluid and production of electric power. More particularly, the invention is concerned with a method and apparatus for simultaneously heating fluid and producing electric power by means of a magnetohydrodynamic (MHD) generator.

Heretofore, there have been suggested various systems for utilizing MHD generators, for the production of electricity in general and, for the production of electricity by means of thermal electric power conversion, in particular. In a number of older systems, fuel was used to drive liquid metal through the MHD-generator by means of plasma produced from fuel combustion, wherein the operating temperatures were relatively high, e.g., above 800° C.

In a more recent development disclosed in the U.S. Pat. No. 3,453,462 there is described an MHD-generator in which a nonconductive gas is heated, for example, by means of a nuclear reactor, to produce gas of high kinetic energy to drive liquid metal mist from a mixing chamber to a MHD-generator in such proportions that the liquid metal coalesces into slugs of metal. The slugs of metal are separated by pockets of the nonconductive gas whose kinetic energy aids in the movement of the slugs through the MHD-generator to generate electric current. After leaving the generator, the slugs are separated from the nonconductive gas. The liquid metal and the gas are recirculated by means of pumps through heat exchangers to increase their respective kinetic energies.

In addition to the fact that such slugs disintegrate and the metal adheres to the walls of the carrying duct, this system also suffers from the drawback that in order to circulate the separated gas, it is necessary to provide the circulating pump with a substantial amount of energy which, of course, greatly detracts from the efficiency of this system to the point of rendering the same uneconomical.

It should also be mentioned that due to the fact that through the MHD-generator there are passed slugs separated by pockets of gas, the generated electricity is in the form of a pulsating or intermittent D.C. and moreover, the electrical currents which is produced is discontinuous, irregular and non-predictable.

The U.S. Pat. No. 3,443,129 discloses a vapor-liquid cycle MHD power conversion system in which contrary to the prior teachings, its stated general object is to provide an MHD thermal electric power conversion system by the use of fluids at low fluid velocities. In one of the disclosed embodiments, it is suggested to drive, in a single loop system, a single substance, namely, an electrically conductive liquid by heating the same at one point along the loop, to form bubbles of the same substance, which bubbles will drive the liquid to a condenser. When condensed, the driven liquid continues to flow through an MHD-generator either by a gravity force or by means of a pump. The liquid is then further directed to the heater to be reheated.

As it can be appreciated, this system must utilize a source of high temperature in order to heat up the liquid metal to its boiling point to form the driving bubbles and, also, through the MHD-generator there is passed, at low velocity, only a single-phase medium.

While the prior art systems are capable of producing electric currents by the conversion of thermal energy into electricity utilizing an MHD-generator, they are able to operate only at high temperature which is very costly to produce. It is, therefore, a broad object of the present invention to provide an MHD thermal electric power conversion system operating in relatively low temperatures and a specific object to provide such a system utilizing solar energy.

SUMMARY OF THE INVENTION

According to the present invention, there is provided a method for producing electrical power by means of a magnetohydrodynamic (MHD) generator, comprising:

providing heating means for heating a mixture of liquid metal and an organic liquid to form a two-phase liquid metal-vapor flow;

directing said two-phase metal-vapor through an MHD-generator to generate electricity;

condensing the vapor phase from said two-phase liquid metal to form liquid metal carrying organic liquid droplets; and recycling said liquid metal and organic liquid droplets to be reheated by said heating means.

The invention also provides an MHD apparatus for producing electrical power comprising:

a closed duct system containing a mixture of liquid metal and an organic liquid;

a heating means for heating the mixture in said closed system;

a magnetohydrodynamic (MHD) generator located along the flow path of a two-phase liquid metal-vapor flow formed by the heated mixture;

means for condensing the two-phase flow to form a single phase of metal liquid containing organic liquid droplets flow; and means for propelling said single-phase flow to be reheated by said heating means.

In accordance with a further embodiment of this invention, it is proposed to fully utilize the available heat energy by providing a combined installation for both, converting relatively low energy, e.g., solar energy into electricity and for heating a fluid, for any use, by means of the heat given off when the two-phase mixture flow is condensed into a single-phase flow. Such a system may have a total efficiency greater than 50%.

Yet, in another aspect of the present invention, there is provided apparatus for converting solar energy into electricity and for heating a fluid comprising:

a closed system containing a mixture of an electrically conductive liquid and of a low boiling temperature propelling liquid;

solar energy absorbing means for heating said mixture to form a two-phase flow;

a magnetohydrodynamic (MHD) generator located along the path of the two-phase flow;

a condensing and heat-exchanging means for condensing said two-phase flow into a single-phase mixture of the electrically conductive liquid containing droplets of the propelling liquid and for heating a fluid circulating in said heat-exchanger; and means for propelling said single-phase mixture to be reheated by said solar energy absorbing means.

BRIEF DESCRIPTION OF THE DRAWINGS

While the invention will now be described in connection with certain preferred embodiments with reference to the following illustrative figures so that it may be more fully understood, it is stressed that the particulars shown and described are by way of example and for purposes of illustrative discussion only and are presented in the cause of providing what is believed to be the most useful and readily understood description of the principles and conceptual aspects of the invention. In this regard no attempt is made to show structural details of the apparatus and their elements in more detail than is necessary for a fundamental understanding of the invention, the description taken with the drawings making apparent to those skilled in the art how the several forms of the invention may be embodied in practice.

In the drawings.

DETAILED DESCRIPTION

Figure 1:
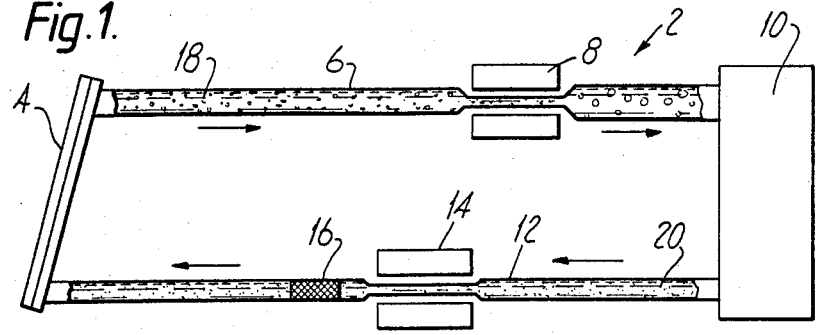
FIG. 1 is a schematic illustration of an MHD system embodying the present invention.

In FIG. 1 there is shown a closed loop or duct system 2 for converting heat from a relatively low-temperature heating means, e.g., solar energy, into electrical current. The system comprises a solar absorber 4, which may be of any known type as, for example, of the flat collector type or of the more elaborate solar energy concentrator type. The interior of the solar absorber 4 is in fluid communication with a conduit 6 leading via an MHD-generator 8 to a condenser 10. The interior of the condenser 10 is in fluid communication with a conduit 12 leading to the absorber 4 via a pump 14, e.g., an MHD-pump. Optionally, between the pump 14 and the absorber 4, there is installed a fluid mixer or dispersing means 16, which disperser may be constituted by a set of screens or by a plurality of vanes inside the conduit 12.

The operation of the apparatus is as follows: a liquid metal electrically conductive liquid, e.g., Nak alloy eutectic, mercury, gallium or tin and a low boiling temperature propelling liquid, e.g., neohexane (for Nak) or freon or water (for mercury, gallium or tin) is introduced in the system forming a mixture of liquid metal and organic liquid. For avoiding phase separation and for the promoting of foaming, surfactant additives, e.g., carbon black, sulfur, selenium for Nak or magnesia for mercury, could optionally also be used.

As the mixture of liquid metal and organic liquid is heated up by means of, for example, the solar energy absorber, when a plane collector or collectors are used, where it is expected that the mixture of liquid metal and organic liquid will heat up to about 110°–120° C., or when a concentrating collector, for example, concentrating mirrors or a parabolic collector, is used, where it is expected that the mixture will heat up to about 300°–400° C., the organic liquid is brought to its boiling temperature and a two-phase liquid metal-vapor 18, is produced. The thusly formed vapor bubbles expand and accelerate the two-phase flow in the conduit 6 through the MHD-generator, thereby producing electricity. The expansion of the vapor bubbles in the conduit is almost isothermal since the heat capacity of the liquid metal is manyfold higher than that of the vapor. The direct contact heat exchanger and the two-phase flow acceleration at constant temperature provides an efficient Rankine-type thermodynamic cycle.

After leaving the MHD-generator, the void fraction is not separated, as it is usually done in other MHD systems, but rather, it is condensed in condenser 10, into droplets of organic liquid forming a mixture 20 of liquid metal and droplets of organic liquid and thus the desired features of retaining throughout the cycle a homogeneous mixture and the recirculation of liquid rather than a gas, is kept.

The liquid metal carrying the droplets of the organic liquid and being in direct-contact heat-exchange therewith is then recycled back to the solar heater to be reheated. This can be achieved by means of the shown MHD pump 14, which pump may use a small part of the electric current produced in the MHD-generator. Before entering the heat absorber 4, the flow 20 is advantageously passed through a mixer or a dispenser 16 where the droplets of the organic liquid are atomized and dispersed more homogeneously in the liquid metal.

Figure 2:
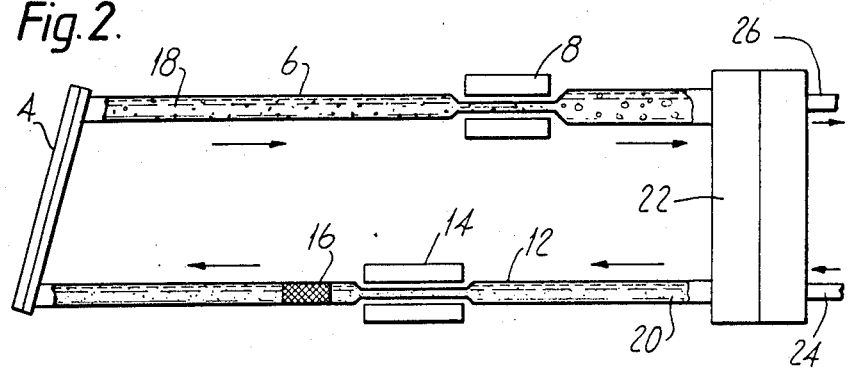
FIG. 2 is a schematic illustration of a modification of the system of FIG. 1.

A modification of the system of FIG. 1 is illustrated in FIG. 2 wherein the same reference numbers are used to identify components having the same function and operation. As it can be seen, the instant system is substantially identical to the previously described one, except for the condenser which, in the present embodiment, is a heat exchange-condenser 22 having an inlet pipe 24 and an outlet pipe 26, respectively supplying to the heat exchanger cold fluid, e.g., water, and extracting therefrom fluid heated by means of the heat energy which is given off by the condensation of the vapor bubbles into liquid droplets. The total efficiency of this system, simultaneously producing electricity and heat, is about 50% even when plane or flat collectors are used.

Figure 3:
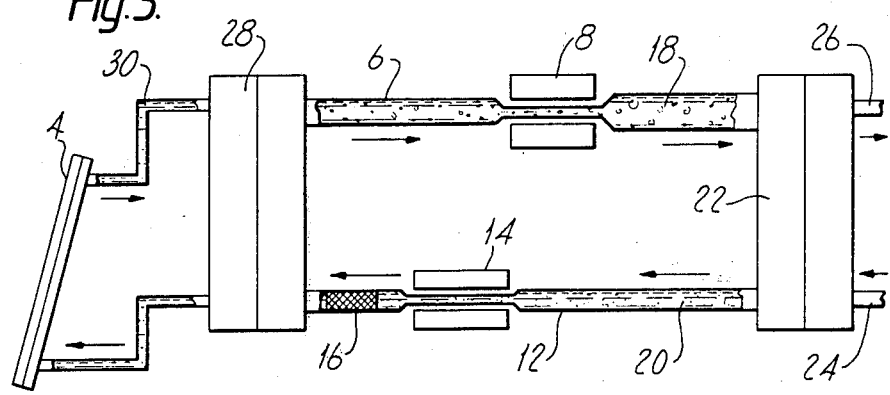
FIG. 3 is a schematic illustration of a further embodiment of an MHD system according to the present invention.

Turning now to FIG. 3, there is illustrated still a further embodiment of the present invention. Here again identical reference numbers are used to identify similar components. According to this embodiment, there is interposed, between the absorber 4 and the conduits 6 and 12, a heat exchanger 28 so that the mixture of liquid metal and organic liquid is heated by the solar energy via the heat exchanger 28 and the heat absorbed in the absorber 4 is transferred to the heat exchanger by means of a liquid 30 circulating between the absorber and the heat exchanger in a closed loop, whereby said recycled liquid metal and organic liquid droplets are indirectly reheated by the energy collected by said solar energy absorber rather than directly as in the previously illustrated embodiments.

Advantageously, the heat carrying liquid from the absorber to heat exchanger may be constituted by a liquid metal, thus forming a highly effective liquid metal-liquid metal heat exchanger. Due to the high thermal conductivity and low vapor pressure of liquid metals, it is possible to increase the temperatures commonly achieved in solar absorbers and, consequently, to obtain a more efficient electricity and hot liquid producing system.

Also, the optional use of permanent magnets in the MHD-generator and/or in the MHD-pump is of advantage since there is no need for energy of the excitation of the necessary magnetic fields.

While particular embodiments of the invention have been described, it will be evident to those skilled in the art that the present invention may be embodied in other specific forms without departing from the essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A method for producing electrical power by means of a magnetohydrodynamic (MHD) generator, comprising
   (a) heating a mixture of liquid metal and a low boiling temperature propelling liquid at a relatively low temperature to form a two-phase liquid metal-vapor flow, the heating temperature being such as to effect substantially isothermal expansion of the vapor bubbles, thereby to accelerate the two-phase flow;
   (b) directing said two-phase metal-vapor flow through an MHD-generator to generate electricity;
   (c) condensing the vapor phase from said two-phase liquid metal to form liquid metal carrying propelling liquid droplets; and
   (d) recycling and reheating said liquid metal and said propelling liquid droplets to again form the two-phase liquid metal-vapor flow.

2. The method according to claim 1, wherein said vapor-phase from said two-phase liquid metal-vapor is condensed by means of a condenser-heat exchanger, and further including the step of circulating a fluid in said condenser-heat exchanger to effect the heating of said fluid by means of the heat given off by the condensation of the vapor-phase.

3. The method according to claim 1, and further including the step of providing an MHD pump along the flow path of the liquid metal and propelling liquid droplets, and propelling the liquid metal and liquid droplets from said generator for subsequent recycling and reheating to the two-phase condition.

4. The method according to claim 1, and further comprising the step of homogeneously dispersing said propelling liquid in the liquid metal prior to heating the mixture to the two-phase condition.

5. The method according to claim 1, wherein said heating is performed in a solar energy absorber, and further wherein said liquid metal and propelling liquid droplets are recycled through said solar energy absorber to be reheated therein.

6. The method according to claim 5, and further comprising the steps of
   (e) providing a heat exchanger between said solar energy absorber and the closed loop fluid flow path;
   (f) providing a liquid metal for absorbing the solar energy in said solar absorber; and
   (g) circulating said liquid metal in a closed loop between said absorber and said heat-exchanger to effect the heating of said mixture of liquid metal and propelling liquid.

7. A magnetohydrodynamic (MHD) apparatus for producing electrical power, comprising
   (a) a closed duct system containing a mixture of liquid metal and a low boiling temperature propelling liquid;
   (b) heating means for heating the mixture in said closed system to produce a two-phase liquid metal-vapor flow, the heating temperature being such as to effect substantially isothermal expansion of the vapor bubbles, thereby to accelerate the two-phase flow;
   (c) a magnetohydrodynamic (MHD) generator located along the flow path of the two-phase liquid metal-vapor flow formed by the heated mixture;
   (d) means for condensing the two-phase flow to form a single phase flow of metal liquid containing propelling liquid droplets; and
   (e) means for propelling said single-phase flow for reheating by said heating means.

8. The apparatus according to claim 7, wherein said means for condensing the two-phase flow comprises a condenser-heat exchanger, and further wherein the heat that is given off by the condensation of the vapor-phase is utilized to heat a fluid circulating in said heat exchanger.

9. The apparatus according to claim 7, wherein said mixture of metal liquid and propelling liquid are heated via a heat-exchanger located between, and being in fluid communication with, said heating means and said closed duct system.

10. The apparatus according to claim 7, wherein said means for propelling the single-phase flow to be reheated by the heating means includes a MHD pump.

11. The apparatus according to claim 7, and further comprising means for dispersing said propelling liquid in the liquid metal prior to the heating thereof by the heating means.

12. The apparatus according to claim 7, wherein said heating means includes a solar energy absorber in fluid communication with the interior of the closed duct system.

13. The apparatus according to claim 12, wherein said solar energy absorber contains liquid metal to be heated and, in turn, heat the mixture flowing in a heat-exchanger located between, and in fluid communication with, said solar energy absorber.

14. Apparatus for converting solar energy into electricity and for heating a fluid comprising
   (a) a closed system containing a mixture of an electrically conductive liquid and of a low boiling temperature propelling liquid;
   (b) solar energy absorbing means for heating said mixture to form a two-phase flow;
   (c) a magnetohydrodynamic (MHD) generator located along the path of the two-phase flow;
   (d) a condensing and heat-exchanging means for condensing said two-phase flow into a single-phase mixture of the electrically conductive liquid containing droplets of the propelling liquid and for heating a fluid circulating in said heat-exchanger; and
   (e) means for propelling said single-phase mixture to be reheated by said solar energy absorbing means.

* * * * *